(12) United States Patent
Pinheiro et al.

(10) Patent No.: US 11,405,451 B2
(45) Date of Patent: Aug. 2, 2022

(54) DATA PIPELINE ARCHITECTURE

(71) Applicant: JPMorgan Chase Bank, N.A., New York, NY (US)

(72) Inventors: Ralph Joseph Pinheiro, Paoli, PA (US); Olutayo Ibikunle, Upper Montclair, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/038,717

(22) Filed: Sep. 30, 2020

(65) Prior Publication Data

US 2022/0103618 A1 Mar. 31, 2022

(51) Int. Cl.
| | | |
|---|---|---|
| *G06F 15/16* | (2006.01) | |
| *H04L 67/1014* | (2022.01) | |
| *H04L 67/02* | (2022.01) | |
| *G06N 20/00* | (2019.01) | |
| *H04L 43/0817* | (2022.01) | |
| *G06N 7/00* | (2006.01) | |
| *H04L 67/61* | (2022.01) | |

(52) U.S. Cl.
CPC ......... *H04L 67/1014* (2013.01); *G06N 7/005* (2013.01); *G06N 20/00* (2019.01); *H04L 43/0817* (2013.01); *H04L 67/02* (2013.01); *H04L 67/322* (2013.01)

(58) Field of Classification Search
USPC .................................................. 709/203, 224
See application file for complete search history.

(56) References Cited

U.S. PATENT DOCUMENTS

| | | | | |
|---|---|---|---|---|
| 10,212,041 | B1* | 2/2019 | Rastogi | H04L 43/08 |
| 10,430,238 | B1* | 10/2019 | Rohrbach | G06F 9/45558 |
| 10,511,690 | B1* | 12/2019 | Chatterjee | H04L 67/02 |
| 10,657,019 | B1* | 5/2020 | Chopra | G06F 11/3006 |
| 2003/0074453 | A1* | 4/2003 | Ikonen | H04L 61/2567 |
| | | | | 709/228 |
| 2004/0058710 | A1* | 3/2004 | Timmins | H04L 67/34 |
| | | | | 455/560 |
| 2006/0206681 | A1* | 9/2006 | Suzuki | G11B 27/329 |
| | | | | 711/170 |
| 2008/0300844 | A1* | 12/2008 | Bagchi | G06Q 10/06 |
| | | | | 703/13 |
| 2010/0088136 | A1* | 4/2010 | Cheng | G06Q 50/06 |
| | | | | 705/7.31 |

(Continued)

*Primary Examiner* — Thuong Nguyen
(74) *Attorney, Agent, or Firm* — Greenblum & Bernstein, P.L.C.

(57) ABSTRACT

A method and a system for managing data flows and data processing operations with respect to a platform are provided. The method includes: executing a first set of microservice applications for coordinating data flows with respect to a data repository; executing a second set of microservice applications for coordinating data processing operations; and executing a third set of microservice applications for performing metadata processing that relates to the data flows and the data processing operations. The system provides an architecture that is designed for delivering information with speed, scale, and quality to diverse destinations and use cases and providing advanced data processing to support real-time streaming processes and aggregated batch processes.

12 Claims, 6 Drawing Sheets

(56) References Cited

U.S. PATENT DOCUMENTS

| | | | |
|---|---|---|---|
| 2010/0257137 A1* | 10/2010 | Escribano Bullon | G06F 16/275 707/623 |
| 2011/0271071 A1* | 11/2011 | Nakatogawa | G06F 3/0685 711/165 |
| 2012/0198151 A1* | 8/2012 | Kato | G06F 3/0605 711/114 |
| 2012/0324092 A1* | 12/2012 | Brown | G06F 9/5072 709/224 |
| 2013/0124809 A1* | 5/2013 | DeJana | G06F 16/24557 711/165 |
| 2016/0124742 A1* | 5/2016 | Rangasamy | H04L 41/0803 717/103 |
| 2016/0381124 A1* | 12/2016 | Hwang | H04L 41/5054 709/226 |
| 2017/0006480 A1* | 1/2017 | Huang | H04W 24/02 |
| 2017/0063687 A1* | 3/2017 | Maskalik | H04L 45/02 |
| 2017/0374174 A1* | 12/2017 | Evens | H04L 67/322 |
| 2018/0019948 A1* | 1/2018 | Patwardhan | H04L 47/2475 |
| 2018/0027080 A1* | 1/2018 | Yang | G06F 8/60 709/224 |
| 2018/0152384 A1* | 5/2018 | Kakadia | H04L 43/026 |
| 2019/0004871 A1* | 1/2019 | Sukhomlinov | G06F 9/5038 |
| 2019/0019090 A1* | 1/2019 | Chacko | G06Q 10/06 |
| 2019/0065775 A1* | 2/2019 | Klucar, Jr | G06F 16/24554 |
| 2019/0098067 A1* | 3/2019 | Sandoval | H02J 13/00024 |
| 2019/0163545 A1* | 5/2019 | Singh | G06F 16/278 |
| 2019/0317776 A1* | 10/2019 | Walsh | G06N 20/00 |
| 2019/0332522 A1* | 10/2019 | Leydon | H04L 65/4084 |
| 2020/0153699 A1* | 5/2020 | Bai | H04L 47/70 |
| 2020/0257566 A1* | 8/2020 | Ganguli | H05K 7/1489 |
| 2020/0295984 A1* | 9/2020 | Qian | H04L 41/0631 |
| 2020/0328977 A1* | 10/2020 | Pfister | H04L 67/1097 |
| 2020/0329114 A1* | 10/2020 | Bahl | G06N 3/006 |
| 2020/0336553 A1* | 10/2020 | Yeddula | H04L 67/02 |
| 2020/0341892 A1* | 10/2020 | Duggal | G06F 3/0647 |
| 2020/0351368 A1* | 11/2020 | Walsh | H04L 69/40 |
| 2020/0396077 A1* | 12/2020 | Wojcik | G06F 21/6281 |
| 2021/0019194 A1* | 1/2021 | Bahl | G06N 20/00 |
| 2021/0029019 A1* | 1/2021 | Kottapalli | H04L 41/16 |
| 2021/0042172 A1* | 2/2021 | Miedema | G06F 9/546 |
| 2021/0064708 A1* | 3/2021 | Dellinger | H04L 51/18 |
| 2021/0073067 A1* | 3/2021 | Sczepczenski | G06F 11/0775 |
| 2021/0075866 A1* | 3/2021 | Naylor | H04L 67/1097 |
| 2021/0152659 A1* | 5/2021 | Cai | G06F 9/5044 |

* cited by examiner

DATA PIPELINE ARCHITECTURE

BACKGROUND

1. Field of the Disclosure

This technology generally relates to methods and systems for providing a data pipeline architecture, and more particularly, to methods and systems for delivering information with speed, scale, and quality to diverse destinations and use cases and providing advanced data processing to support real-time streaming processes and aggregated batch processes.

2. Background Information

A data ecosystem must enable a financial services provider to serve its customers, to inform its businesses through reporting, ad hoc analysis, and/or modeling, provide insights to partners and provide financial and regulatory reporting to investors and government agencies. Expectations for data agility in support of these use cases and the ability to leverage artificial intelligence and machine learning to innovate requires an implementation of a framework that is always on, highly resilient, and scalable.

Conventional data processing systems use platforms that are highly proprietary and closed. Typically, such platforms require niche information technology skills for development, and may be relatively inflexible regarding agile development and integration with other architectures. Conventional data processing systems may be deployed in a centralized manner such that storage and computing are coupled together, and may not be cloud ready. These factors may lead to reduced business agility, reduced and reduced resiliency.

Accordingly, there is a need for a robust data pipeline capability that delivers information with speed, scale, and quality to diverse destinations and use cases, and provides advanced data processing to support real-time streaming processes and aggregated batch processes.

SUMMARY

The present disclosure, through one or more of its various aspects, embodiments, and/or specific features or sub-components, provides, inter alia, various systems, servers, devices, methods, media, programs, and platforms for delivering information with speed, scale, and quality to diverse destinations and use cases and providing advanced data processing to support real-time streaming processes and aggregated batch processes.

According to an aspect of the present disclosure, a method for managing data flows and data processing operations with respect to a platform is provided. The method is implemented by at least one processor. The method includes: executing, by the at least one processor, a first set of microservice applications for coordinating data flows with respect to a first memory; executing, by the at least one processor, a second set of microservice applications for coordinating data processing operations; and executing, by the at least one processor, a third set of microservice applications for performing metadata processing that relates to the data flows and the data processing operations.

The first set of microservice applications may include at least one from among an inbound data flow microservice application that relates to first data flows that originate at a source that is external to the platform and terminate within the platform, an in-place data flow microservice application that relates to second data flows that originate and terminate within the platform, and an outbound data flow microservice application that relates to third data flows that originate within the platform and terminate at a destination that is external to the platform.

The second set of microservice applications may include at least one from among a data ingestion microservice application that relates to ingesting data from a source that is external to the platform, a data transformation microservice application that relates to transforming data within the platform, a data stream processing microservice application that relates to performing continuous stream processing, a data movement microservice application that relates to a bulk-copying of data from a first location within the platform to a second location within the platform, and a data provisioning microservice application that relates to provisioning data into a predetermined destination.

The third set of microservice applications may include at least one from among a metadata sourcing microservice application that relates to capturing a lineage of data that flows within the platform, a metadata registration microservice application that relates to storing metadata in a second memory, and a data quality microservice application that relates to generating metrics that indicate a quality of the data that flows within the platform.

The method may further include executing, by the at least one processor, a fourth set of microservice applications for controlling the data flows and the data processing operations with respect to the platform.

The fourth set of microservice applications may include at least one from among a data flow controller microservice application that relates to assigning each of the data flows to a respective cluster within the platform, a data flow registry microservice application that relates to registering a respective template for each of the data flows, and an operational services microservice application that relates to generating operational metadata for each of the data flows.

The executing of the data flow controller microservice application may include using, for a particular data flow, at least one from among a location of a corresponding source and a location of a corresponding destination in order to determine a particular cluster to which the particular data flow is assigned.

The first set of microservice applications may include a data flow order microservice application that relates to determining a processing order for a cluster-specific set of data flows that are assigned to a corresponding cluster.

The method may further include generating at least one directed acyclic graph (DAG) that corresponds to at least one of the data flows.

The first set of microservice applications may include a DAG interconnection microservice application that relates to using the at least one DAG to coordinate the at least one of the data flows.

The method may be implemented in a distributed hybrid cloud computing environment across a plurality of data planes.

The method may further include: performing predictive workload balancing among the plurality of data planes based on current and predicted demand; determining resource availability among the plurality of data planes; ensuring compliance with at least one data privacy policy; and performing tracking of at least one predetermined service level agreement (SLA) with respect to a current backlog.

The method may further include using a machine learning algorithm to determine a data gravity for optimizing at least one from among a location of at least one of the data flows and a creation of an incremental cache.

The resource availability may be determined based on at least one from among a cost factor, a data gravity factor, a bandwidth availability factor, a priority factor with respect to the at least one SLA, a processor speed factor, and a parallel processing optimization factor.

According to another exemplary embodiment, a computing apparatus for managing data flows and data processing operations with respect to a platform is provided. The computing apparatus includes a processor, a memory, and a communication interface coupled to each of the processor and the memory. The processor is configured to: execute a first set of microservice applications for coordinating data flows with respect to the memory; execute a second set of microservice applications for coordinating data processing operations; and execute a third set of microservice applications for performing metadata processing that relates to the data flows and the data processing operations.

The first set of microservice applications may include at least one from among an inbound data flow microservice application that relates to first data flows that originate at a source that is external to the platform and terminate within the platform, an in-place data glow microservice application that relates to second data flows that originate and terminate within the platform, and an outbound data flow microservice application that relates to third data flows that originate within the platform and terminate at a destination that is external to the platform.

The second set of microservice applications may include at least one from among a data ingestion microservice application that relates to ingesting data from a source that is external to the platform, a data transformation microservice application that relates to transforming data within the platform, a data stream processing microservice application that relates to performing continuous stream processing, a data movement microservice application that relates to a bulk-copying, of data from a first location within the platform to a second location within the platform, and a data provisioning microservice application that relates to provisioning data into a predetermined destination.

The third set of microservice applications may include at least one from among a metadata sourcing microservice application that relates to capturing a lineage of data that flows within the platform, a metadata registration microservice application that relates to storing metadata in a second memory, and a data quality microservice application that relates to generating metrics that indicate a quality of the data that flows within the platform.

The processor may be further configured to execute a fourth set of microservice applications for controlling the data flows and the data processing operations with respect to the platform.

The fourth set of microservice applications may include at least one from among a data flow controller microservice application that relates to assigning each of the data flows to a respective cluster within the platform, a data flow registry microservice application that relates to registering a respective template for each of the data flows, and an operational services microservice application that relates to generating operational metadata for each of the data flows.

The processor may be further configured to use, for a particular data flow, at least one from among a location of a corresponding source and a location of a corresponding destination in order to determine a particular cluster to which the particular data flow is assigned.

The first set of microservice applications may include a data flow order microservice application that relates to determining a processing order for a cluster-specific set of data flows that are assigned to a corresponding cluster.

The processor may be further configured to generate at least one directed acyclic graph (DAG) that corresponds to at least one of the data flows.

The first set of microservice applications may include a DAG interconnection microservice application that relates to using the at least one DAG to coordinate the at least one of the data flows.

The computing apparatus may be implemented in a distributed hybrid cloud computing environment that includes at least one open source data processing container platform, at least one open source Spark distributed processing engine, and at least one deployment pipeline deployed across a data lake. The computing apparatus may be integrated with each of an organizational network and infrastructure security, an organizational monitoring and alerting system, and an organizational operational infrastructure.

The hybrid cloud environment may further include a set of organizational data catalog and data governance standards.

The set of organizational data catalog and data governance standards may include at least one from among a data set naming standard, a data set addressability standard, a data format standard, an application programming interface standard, and a data protection and access control standard.

The processor may be further configured to facilitate an ability of an end user to configure a data processing engine based on at least one from among data sourcing information that relates to the hybrid cloud environment and an identification of a data gravity with respect to meeting a requirement of a service level agreement (SLA).

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
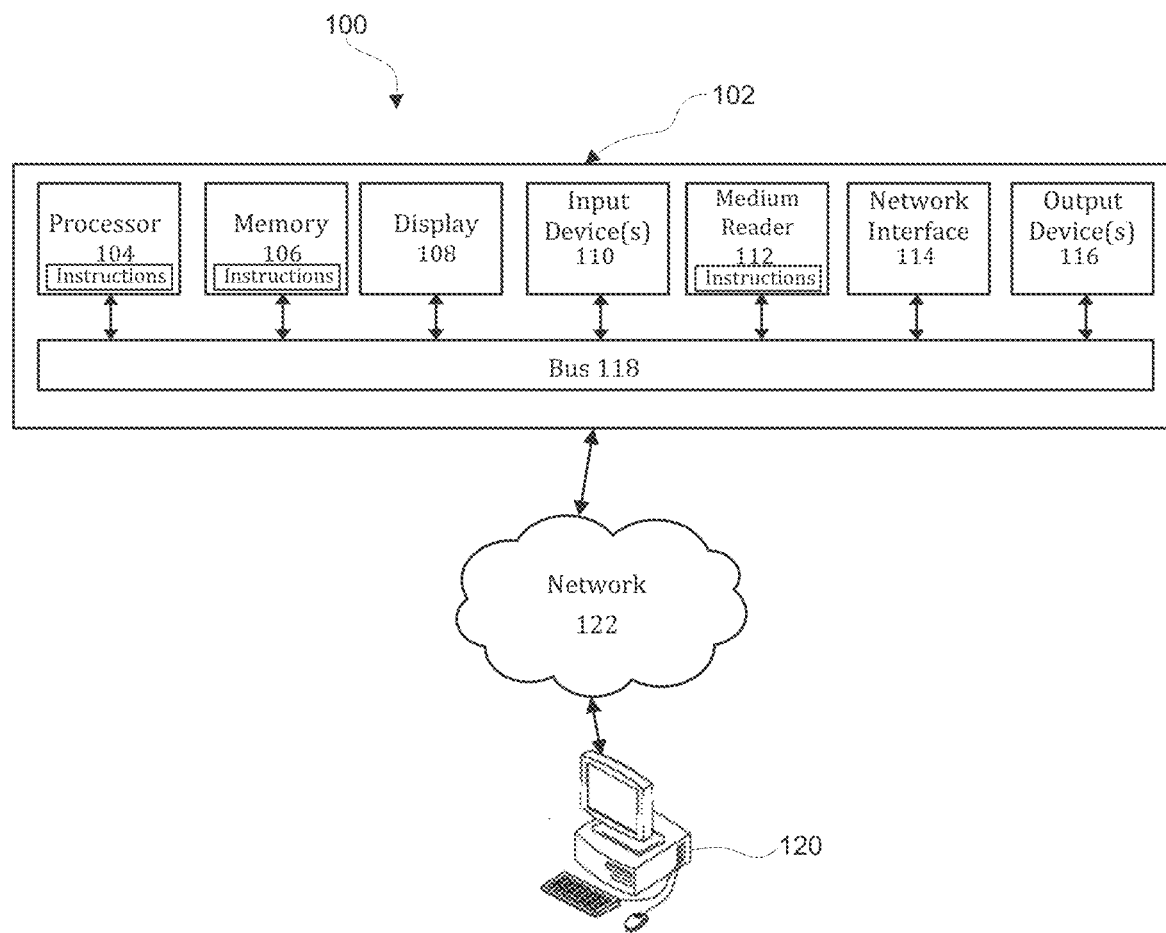
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP) a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED) a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112 and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that, any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for delivering information with speed, scale, and quality to diverse destinations and use cases and providing advanced data processing to support real-time streaming processes and aggregated batch processes.

Figure 2:
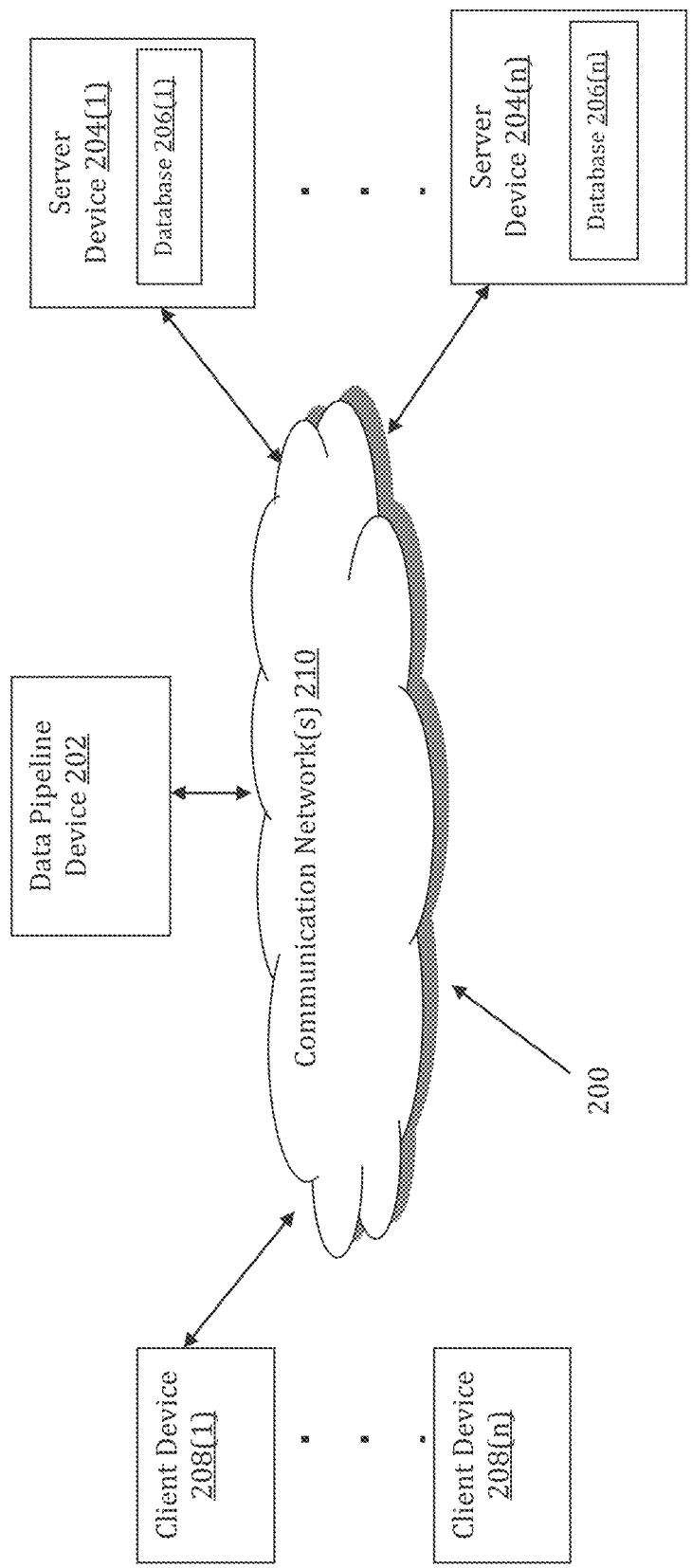
FIG. 2 illustrates an exemplary diagram of a network environment.

Referring to FIG. 2, a schematic of an exemplary network environment 200 for implementing a method for delivering information with speed, scale, and quality to diverse destinations and use cases and providing advanced data processing to support real-time streaming processes and aggregated batch processes is illustrated. In an exemplary embodiment, the method is executable on any networked computer platform, such as, for example, a personal computer (PC).

The method for delivering information with speed, scale, and quality to diverse destinations and use cases and providing advanced data processing to support real-time streaming processes and aggregated batch processes may be implemented by a Data Pipeline (DP) device 202. The DP device 202 may be the same or similar to the computer system 102 as described with respect to FIG. 1. The DP device 202 may store one or more applications that can include executable instructions that, when executed by the DP device 202, cause the DP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also the application(s), and even the DP device 202 itself, may be located in virtual server(s) running in a cloud-based computing environment rather than being tied to one or more specific physical network computing devices. Also, the application(s) may be running in one or more virtual machines (VMs) executing on the DP device 202. Additionally, in one or more embodiments of this technology, virtual machine(s) running on the DP device 202 may be managed or supervised by a hypervisor.

In the network environment 20C of FIG. 2, the DP device 202 is coupled to a plurality of server devices 204(1)-204(n) that hosts a plurality of databases 206(1)-206(n), and also to a plurality of client devices 208(1)-208(n) via communication network(s) 210. A communication interface of the DP device 202, such as the network interface 114 of the computer system 102 of FIG. 1, operatively couples and communicates between the DP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DP devices that efficiently implement a method for delivering information with speed, scale, and quality to diverse destinations and use cases and providing advanced data processing to support real-time streaming processes and aggregated batch processes.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DP device 202 may be a standalone device or integrated with one or more other devices or apparatuses, such as one or more of the server devices 204(1)-204(n), for example. In one particular example, the DP device 202 may include or be hosted by one of the server devices 204(1)-204(n) and other arrangements are also possible. Moreover, one or more of the devices of the DP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(11) host the databases 206(1)-206(n) that are configured to store data flow registry data and business and operational metadata.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DP device 202, the server devices 204(1)-204(n), or the client devices 208(1)-208(n), for example, may be configured to operate as virtual instances on the same physical machine. In other words, one or more of the DP device 202, the server devices 204(1)-204(n), or the client devices 208(1)-208(n) may operate on the same physical device rather than as separate devices communicating through communication network(s) 210. Additionally, there may be more or fewer DP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
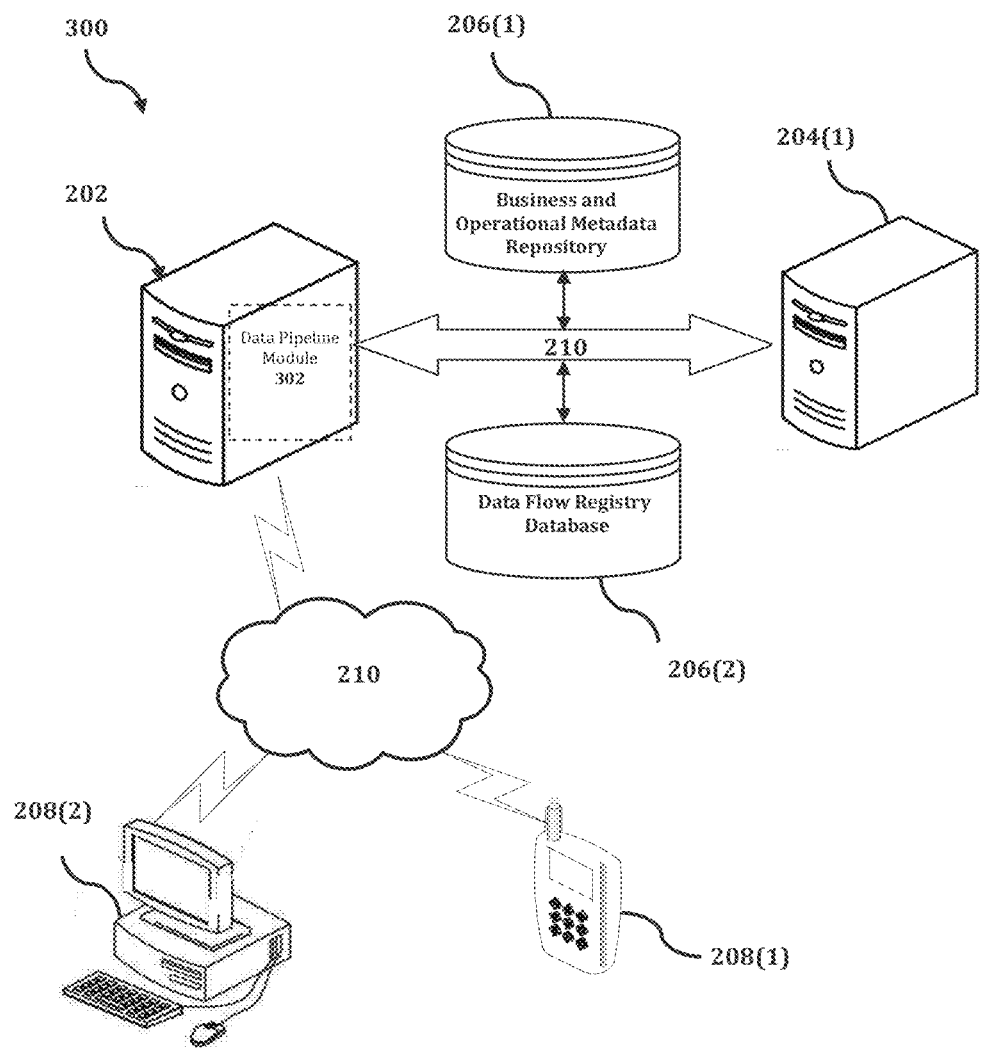
FIG. 3 shows an exemplary system for implementing a method for delivering information with speed, scale, and quality to diverse destinations and use cases and providing advanced data processing to support real-time streaming processes and aggregated batch processes.

The DP device 202 is described and shown in FIG. 3 as including a data pipeline module 302, although it may include other rules, policies, modules, databases, or applications, for example. As will be described below, the data pipeline module 302 is configured to implement a method for delivering information with speed, scale, and quality to diverse destinations and use cases and providing advanced data processing to support real-time streaming processes and aggregated batch processes in an automated, efficient, scalable, and reliable manner.

An exemplary process 300 for implementing a method for delivering information with speed, scale, and quality to diverse destinations and use cases and providing advanced data processing to support real-time streaming processes and aggregated batch processes by utilizing the network environment of FIG. 2 is shown as being executed in FIG. 3. Specifically, a first client device 208(1) and a second client device 208(2) are illustrated as being in communication with DP device 202. In this regard, the first client device 208(1) and the second client device 208(2) may be "clients" of the DP device 202 and are described herein as such. Nevertheless, it is to be known and understood that the first client device 208(1) and/or the second client device 208(2) need not necessarily be "clients" of the DP device 202, or any entity described in association therewith herein. Any additional or alternative relationship may exist between either or both of the first client device 208(1) and the second client device 208(2) and the DP device 202, or no relationship may exist.

Further, DP device 202 is illustrated as being able to access a business and operational metadata repository 206(1) and a data flow registry database 206(2). The data pipeline module 302 may be configured to access these databases for implementing a method for delivering information with speed, scale, and quality to diverse destinations and use cases and providing advanced data processing to support real-time streaming processes and aggregated batch processes.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DIP device 202 via broadband or cellular communication. Of course, these embodiments are merely exemplary and are not limiting or exhaustive.

Upon being started, the data pipeline module 302 executes a process for delivering information with speed, scale, and quality to diverse destinations and use cases and providing advanced data processing to support real-time streaming processes and aggregated batch processes. An exemplary process for managing data flows and data processing operations with respect to a platform is generally indicated at flowchart 400 in FIG. 4.

Figure 4:
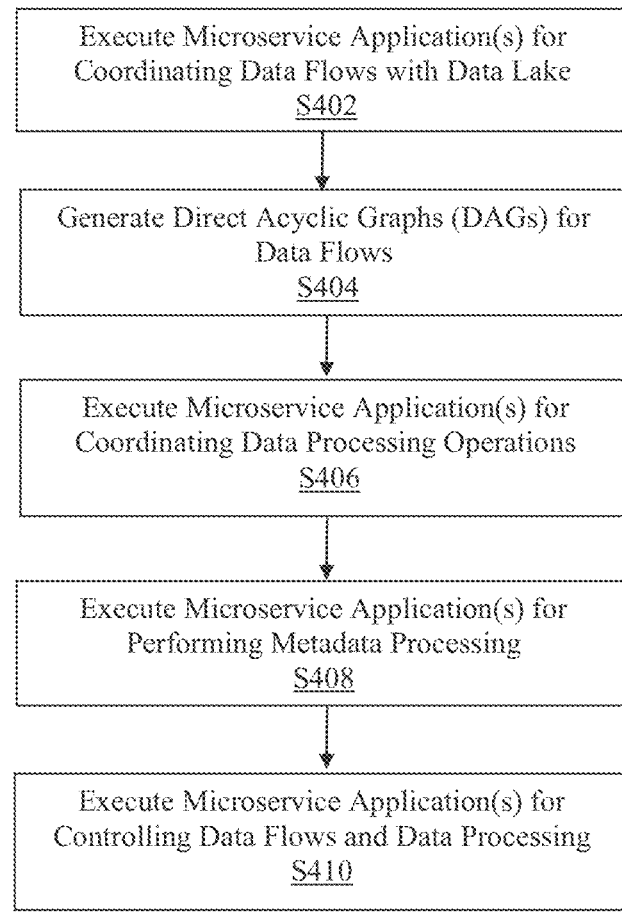
FIG. 4 is a flowchart of an exemplary process for implementing a method for delivering information with speed, scale, and quality to diverse destinations and use cases and providing advanced data processing to support real-time streaming processes and aggregated batch processes.

In the process 400 of FIG. 4, at step S402, the data pipeline module 302 executes a first set of microservice applications for coordinating data flows with respect to a memory, such as, for example, a data lake or a data repository. In an exemplary embodiment, the first set of microservice applications may include one or more of the following: an inbound data flow microservice application that relates to data flows that originate from sources that are external to the platform and terminate within the platform; an in-place data flow microservice application that relates to data flows that originate and terminate within the platform; an outbound data flow microservice application that relates to data flows that originate within the platform and terminate at destinations that are external to the platform; and a data flow order microservice application that relates to determining a processing order for a set of data flows, such as, for example, a cluster-specific set of data flows that are assigned to a particular cluster within the platform.

At step S404, the data pipeline module 302 generates a respective directed acyclic graph (DAG) for each of the data flows that is being coordinated on the platform. In an exemplary embodiment, the first set of microservice applications may further include a DAG interconnection microservice application that relates to using the DAGs to coordinate the data flows by interconnecting DAGs to form sophisticated and advanced data orchestration topologies.

At step S406, the data pipeline module 302 executes a second set of microservice applications for coordinating data processing operations. In an exemplary embodiment, the second set of microservice applications may include one or more of the following: a data ingestion microservice application that relates to ingesting data from a source that is external to the platform; a data transformation microservice application that relates to transforming data within the platform; a data stream processing microservice application that relates to performing continuous stream processing; a data movement microservice application that relates to bulk-copying of data from a first location within the platform to a second location within the platform; and a data provisioning microservice application that relates to providing data into a predetermined destination.

At step S408, the data pipeline module 302 executes a third set of microservice applications for performing metadata processing that relates to the data flows and the data processing operations. In an exemplary embodiment, the third set of microservice applications may include one or more of the following: a metadata sourcing microservice application that relates to capturing a lineage of data that flows within the platform; a metadata registration microservice application that relates to storing metadata in a memory, such as, for example, a metadata registry database; and a data quality microservice application that relates to generating metrics that indicate a quality of the data that flows within the platform.

At step S410, the data pipeline module 302 executes a fourth set of microservice applications for controlling the data flows and the data processing operations with respect to the platform. In an exemplary embodiment, the fourth set of microservice applications may include one or more of the following: a data flow controller microservice application that relates to assigning each of the data flows to a respective cluster within the platform; a data flow registry microservice application that relates to registering a respective template for each of the data flows; and an operational services microservice application that relates to generating operational metadata for each of the data flows. In an exemplary embodiment, the data flow controller microservice application may use a location of a source for a particular data flow and a location of a corresponding destination for the particular data flow for determining a cluster to which the particular data flow is to be assigned.

According to an exemplary embodiment, a Smart Data Pipeline Architecture includes workload orchestration logic which is designed to optimally leverage a hybrid cloud topology and capabilities for high performance compute on-demand, cost optimization, and bursting to fulfill critical service level agreements (ISLAS). These capabilities are intentionally designed to support the needs of next-generation data architectures supporting artificial intelligence (AI), machine learning (ML), and very large (i.e., petabyte scale) Big Data processing workloads.

According to an exemplary embodiment, a Data Pipeline technical architecture may be defined based on Photon, and designed for a distributed multi-cloud environment. The architecture includes a cohesive set of interoperable microservices that interact with each other to provide the data ingestion, transformation processing, management and provisioning features required in a modern Data Pipeline platform. Also, in contrast to traditional monolithic platform architectures, the Data Pipeline architecture disclosed herein disaggregates the data transformation function into two distinct layers: 1) a Data Plane, and 2) a Control Plane, each layer including a set of core microservices that can be deployed in a highly distributed manner, in order to help orchestrate all the data movement and processing to, from and within a Logical Data Lake (LDL), which may be deployed on a multi-cloud environment.

According to an exemplary embodiment, the architecture facilitates Big Data processing on a distributed multi-cloud topology with the Control Plane orchestrating big data processing workloads across multiple Data Planes in a distributed hybrid cloud based data processing topology to leverage and optimize processing. The architecture achieves these objectives based on the following: 1) Predictive workload balancing: Scale-up, scale-down, terminate, data planes based on current and predicted demand. 2) Factor-in compute capacity available at cheapest cost (spot pricing, reserved clusters) and appropriate resource availability on the hybrid cloud. Key selection factors include data gravity, bandwidth, latency, SLAs and priorities, processor speed, parallel processing optimization, and other non-functional requirements (NFRs), such as regulatory, privacy, and contractual obligations. 3) Factor-in Data Privacy compliance, such as, for example, the European Union's General Data Protection Regulation, into the smart processing policy. 4) Dynamic tracking and management of predefined operational SLAs versus current backlogs to make a predictive/deterministic assessment to spin up additional data planes for smooth workload management, and to offer a more predictable data delivery. Leverage dynamic resiliency status and predefined data SLAs to determine whether a higher performance compute cluster is required to catch-up on SLAs. 5) Optimally build incremental caches and collocate data processing closer to where the data gravity exists based on machine learning algorithms trained on daily runs of the data processing jobs. Use of storage virtualization technology can facilitate this need. 6) Terminate data planes efficiently based on usage to save operational costs over time.

In an exemplary embodiment, the portable data processing infrastructure is enabled by key capabilities, including: 1) Open source data processing container platforms (e.g., Kubernetes), open source Spark distributed processing engines, and CI/CD deployment pipelines deployed across the Logical Data Lake (LDL), all tied to organizational network and infrastructure security, monitoring and alerting, and operational infrastructure. 2) Central data catalog and data governance standards implemented across the hybrid cloud including data set naming and addressability, data formats, APIs, data protection and access controls, all tied to organizational data management and security/protection standards.

In an exemplary embodiment, self-service, metadata driven architecture that allows end users to configure their data processing engines is based on the following: 1) Data sourcing from authoritative sources, i.e., anywhere on the hybrid cloud. 2) Ability to identify data gravity and adjacent data consumption capabilities to meet critical data availability SLAs.

The following description relates to the two main layers of the Data Pipeline architecture:

Data Plane: This is a logical construct that supports all necessary services to orchestrate data flows within the Data Pipeline system. This layer relies on highly scalable processing power to support the high volume of data pipeline jobs expected in the LDL, and to support the main characteristics of big data processing, i.e., "the 3 Vs"—volume, velocity, and variety. The Data Plane is composed of multiple data processing clusters spread across a distributed multi-cloud topology, to take advantage of data locality, storage and compute scale.

Control Plane: This is a logical construct that supports all necessary services to operate the Data Pipeline. The Control Plane acts as a central master controller that orchestrates all of the concurrent data pipeline flows across the Data Plane. The LDL has one centralized Control Plane, which due to its critical role, must be deployed independent of any Data Plane clusters, and deployed in a highly available, scalable, and resilient configuration. The separation of Data and Control Planes is critical, in order to facilitate an ability to elastically scale-up, scale-down, or terminate Data Plane clusters independently based on current demand. Further, the Control Plane must be a long lived and continuously available process.

Finally, the Data Pipeline architecture focuses on speed of delivery based on design characteristics and foundations on the Photon architecture pattern and Photon framework. This focus is essential to the data agility required to support continuous business innovation, and to deliver the tight customer-centric experiences, at the right time. The Data Pipeline product is also a key enabler of the LDL strategy and architecture.

According to an exemplary embodiment, the following is a list of key business drivers that relate to the Data Pipeline architecture: 1) The ability to source and use all available data create business interest, analytics and artificial intelligence/machine learning (AWL) products, and to do so in an efficient manner, and within the shortest possible time-to-market. 2) The ability to certify data privacy, protection, consistency, quality, accuracy, and completeness and ensure data is sourced from approved and registered domain Systems of Record (SOR) and Authoritative Data Sources (ADS) including external third party vendors/aggregators. 3) Adhere to all applicable organizational policies and governance, technology, architecture, risk, technology and business controls.

According to an exemplary embodiment, the following is a list of key technology drivers and objectives that relate to the Data Pipeline architecture: 1) The flexibility to source and process multiple types and formats of data from multiple types of sources, both internal and external to an organizational network. 2) The ability to transform and enrich data that is ingested into new data that is registered, protected and managed. 3) The flexibility to provision data into multiple fit-for-purpose data consumption points, while limiting provisioning (through policies) into platforms under audit/controls or on the path to be decommissioned. 4) The ability to support batch processing for large files, as web as real-time stream processing for event streams. 5) The ability to configure and enforce appropriate data access and data use policies in the pipeline based on service or user entitlements, for full transparency and governance. 6) The ability to capture and manage business and operational metadata to enable proper identification of data assets, flows, and usage in the ecosystem. 7) The ability to verify technical and business data quality and lineage. 8) The ability to manage data sprawl in the data ecosystem, including data consumption points. 9) The ability to manage to business-defined non-functional service level agreements (SLAs) in terms of data availability, system up-time, and throughput. 10) The ability to observe the end-to-end operations of the data pipeline, audit the process execution after the fact, and be able to rectify data transfer or processing failures. 11) The ability to integrate with and leverage a multi-cloud Logical Data Lake (LDL), and to benefit from the efficiencies of cloud-based environments.

deployment necessitates the Data Plane clusters to optimally collocate Data Pipeline workloads closer to data producers and/or consumers.

The Data Plane is composed of three types of interoperable components each of which are implemented as microservices and independently scalable.

First, Data Flows: A data flow helps orchestrate data movement for the LDL. Each data flow can be conceptualized as a Directed Acyclic Graph (DAG) to help manage dependencies whether sequential or parallel, and a DAG can be interconnected with other DAGs to form more sophisticated and advanced data orchestration topologies. Data flows fall under three categories based on where data is moved to and from: 1) Inbound: SOR, ADSs and external sources into the conformed zone within the LDL. 2) In-Place: Data transformations that create new data in-place within the data ecosystem. 3) Outbound: from the LDL and provisioned into standardized and approved consumption points.

Second, Data Processors: Each data flow can be configured declaratively to use one or more processors in sequence, in parallel, or both. Data Transformation Processors can be categorized into the following four types based how data is operated upon: 1) Data Ingestion: ingests data from a source that is external the LDL; includes pre-processing, 2) Data Transformation: transforms data in the

TABLE 1

Key Architecture Principles

| | Principles | Data Pipeline Engineering Implications |
|---|---|---|
| a. | Primacy of the New Banking Architecture (NBA) principles and patterns | Build the Data Pipeline using NBA core principles and Photon Engineering Patterns<br>i. Build Autonomous Applications<br>ii. Build Applications using Application Programming Interfaces (APIs)<br>iii. Build Secure Applications<br>iv. Build Resilient Applications<br>v. Define User-Created Data |
| b. | Application Autonomy and Agility | i. Domain Driven Design to design microservices, APIs and events.<br>ii. Integrate with Jules for agile continuous integration/continuous deployment (CI/CD) for data pipeline applications. |
| c. | Resiliency of Operations | i. Photon applications and data resiliency patterns.<br>ii. Deploy across a multi-data center topology for increased fault tolerance. |
| d. | Reliability of Service | i. Saga Orchestration pattern and Event Reconciliation patterns to ensure application data consistency and integrity.<br>ii. Implement Photon site reliability engineering (SRE) patterns to identify performance or throughput bottlenecks, and analyze trends.<br>iii. Use cloud platform specific auto-scalability and load-balancing features to ensure predictable operational performance. |

Figure 5:
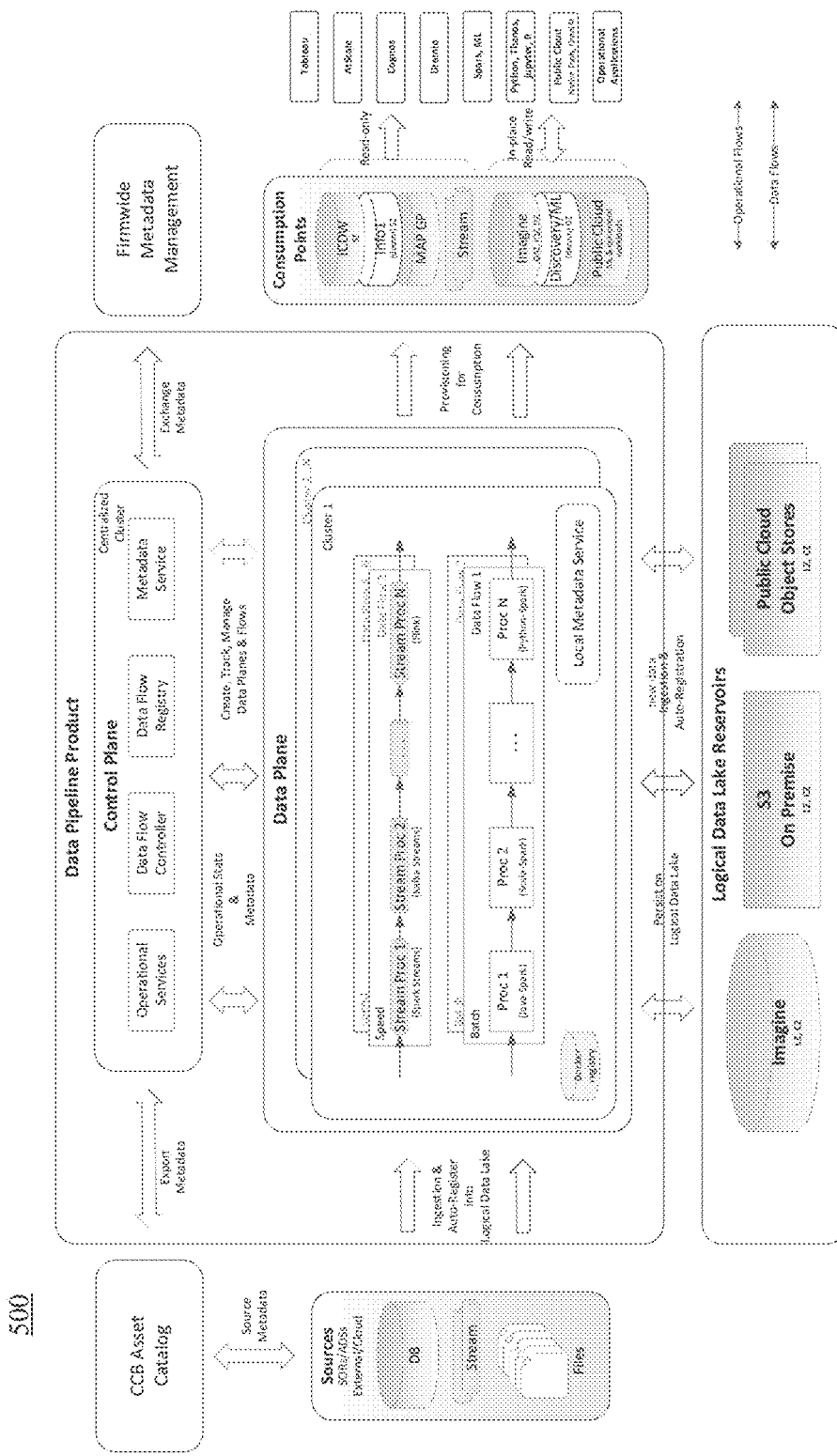
FIG. 5 is an architecture diagram of a system for implementing a method for delivering information with speed, scale, and quality to diverse destinations and use cases and providing advanced data processing to support real-time streaming processes and aggregated batch processes, according to an exemplary embodiment.

FIG. 5 is an architecture diagram 500 of a system for implementing a method for delivering information with speed, scale, and quality to diverse destinations and use cases and providing advanced data processing to support real-time streaming processes and aggregated batch processes, according to an exemplary embodiment.

Referring to FIG. 5, the Data Plane is a logical construct that supports all of the services that are necessary to orchestrate data flows within the Data Pipeline system. This layer relies on a large amount of highly scalable processing power to support a high volume of data ingestion, transformation, and movement jobs for the LDL, with all the characteristics of Big Data processing—i.e. the 3 Vs. The Data Plane is composed of multiple data processing clusters spread across a distributed multi-cloud topology, to take advantage of data locality, storage and compute scale. The distributed LDL context of the data flow. 3) Data Stream Processors: continuous stream processing. 4) Data Movement: simply hulk copies data from one location to another in the LDL. Data Provisioning: provisions data into a standardized consumption point.

Third Local Metadata Service: Each Data Plane is bootstrapped with a Local Metadata Service which auto-hydrates from the Global Metadata Service that brokers metadata for the entire LDL and external metadata repositories. This local service fulfills critical Data Management functions, including: 1) Metadata Sourcing or Capture and Registration including lineage for any data that is ingested, created and provisioned out of the LDL, and integrating the metadata to a corresponding database or data repository. 2) Data Quality Capture including business and technical data quality (DQ) metrics and indicators should be extracted and managed with the data sets, just like the other metadata.

Control Plane: The Logical Data Lake has a single Control Plane, which is a logical construct that supports all of the services that are necessary to operate the Data Pipeline. The Control Plane acts as a central master controller that orchestrates all of the concurrent data flows across all clusters on the Data Plane. Due to its critical role, the Control Plane needs to be deployed independent of any Data Plane clusters, and on its own cluster, in a highly available, scalable, and resilient configuration.

The Control Plane has the following services that operate on a cohesive operational meta-model: 1) Data Flow Registry Service for all the Data Flows within the Data Pipeline system. 2) Data Flow Controller Service that creates and manages all the Data Flows in the system. 3) Global Metadata Service contains up-to-date metadata on all Data Assets in the system, and brokers requests to import/export metadata with metadata repositories. 4) Operational Services help manage and present a dynamic operational view of the Data Pipeline system.

Data Pipeline Deployment: In an exemplary embodiment, the Data Pipeline architecture is unified on a single container infrastructure—Kubernetes—in order to provide standardization and portability of code across a multi-cloud environment. Spark provides a large scale, highly resilient, data processing framework. Spark 2.3+ integrates natively on Kubernetes, thereby enabling true elastic scalability for Spark jobs. Spark on Kubernetes along with resilient distributed storage (HDFS or S3), form the de facto deployment platform for the Data.

The Control Plane services and Data Plane services are deployed on separate Kubernetes clusters. This separation is critical to the architecture for the following reasons:

First, the separation allows the Control Plane to identify demand and scale instances of Data Planes elastically based on this demand. The Control Plane can even shut-down one or more Data Planes when not required, in order to save on costs. The Control Plane can decide, for example, when to intelligently burst into the public cloud for seasonal peak loads and/or when public cloud compute is cheaper. However, the Control Plane must be a long lived and continuously available process.

Second, the separation allows for a deployment of the Control Plane in a more globally distributed topology, while the Data Plane clusters can be more localized in their deployment.

Figure 6:
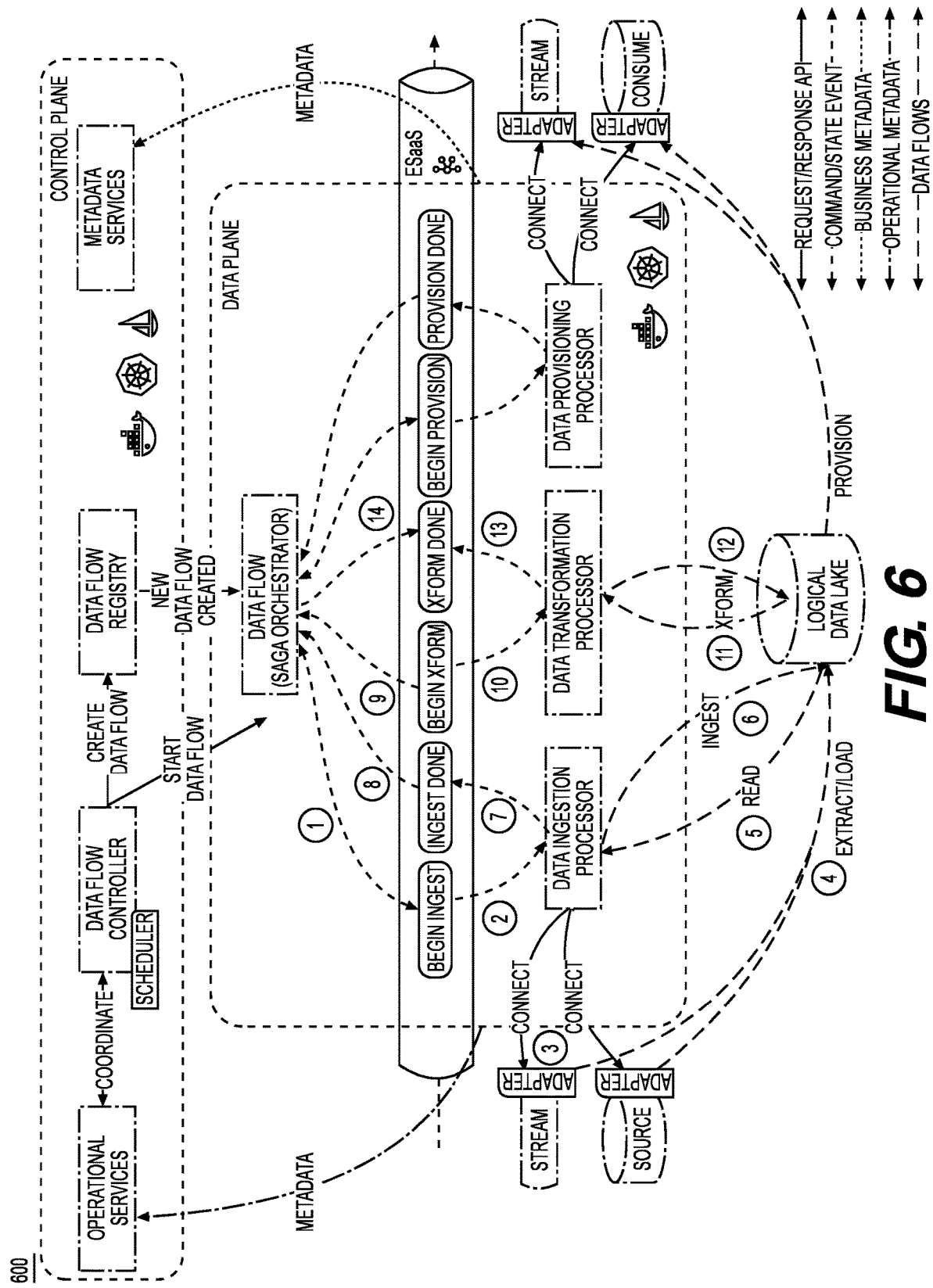
FIG. 6 is a data flow diagram of a system for implementing a method for delivering information with speed, scale, and quality to diverse destinations and use cases and providing advanced data processing to support real-time streaming processes and aggregated batch processes according to an exemplary embodiment.

FIG. 6 is a data flow diagram 600 of a system for implementing a method for delivering information with speed, scale, and quality to diverse destinations and use cases and providing advanced data processing to support real-tinge streaming processes and aggregated batch processes, according to an exemplary embodiment.

Referring to FIG. 6, the following is a description of component design characteristics:

1) Data Flow Controller: The Data Flow Controller is part of the Control Plane. It is responsible for creating a pool of Data Flow services in a cluster, and managing their execution and lifecycle. A configurable pool of long-running Data Flow Services can be created ahead of time, and based on pre-defined template flows (DAGs) registered in the Data Flow Registry. The Controller itself is a long-running microservice that is created when the Data Pipeline Service is bootstrapped.

One of the key functions of the Controller is the intelligent placement of each Data Flow into a cluster on the Data Plane. This is based the following criteria: 1) The main criterion is to co-locate Data Flows with data sources for rapid ingestion into the LDL, and/or with consumption points for rapid provisioning in order to meet data availability service level agreements (SLAs). 2) A secondary criterion is to take advantage of the dynamic cluster capacity utilization that it has visibility to across all clusters, and place Data Flows where capacity is not constrained.

Data Flow Registry: This is a centralized service which is part of the Control Plane. The Data Flow Registry acts as a repository of Data Flow templates. The Data Flow Registry supports a user interface (UI) that helps users design and deploy Data Flow templates. The Data Flow Registry also exposes an application programming interface (API) to automate template registration. This registry model presents an opportunity for reusing Data Flow graphs based on data processing patterns.

3) Data Flow: This is a microservice that is created and placed by the Data. Flow Controller in the appropriate cluster on the Data Plane. Each flow is responsible for orchestrating the order in which data gets processed within the system. In an exemplary embodiment, the Data Flow adopts the Saga Orchestration pattern, along with an asynchronous event-driven model based on the enterprise Kafka service—EsaaS and Photon event standards.

4) Standard Data Flow Execution: The data flow orchestration is triggered by a command event from the Data Flow Controller. This starts the chain of events, each triggering specific Data Processor nodes according to the DAG specification. The Data Flow service listens for state change events on a reply channel and can take appropriate next steps—again based on DAG specification—i.e., whether the "processing completes successfully," or on a "processing exception," or a "DQ exception."

5) Data Flow Resiliency: The Operations Service, which is part of the centralized Control Plane, exposes an API in order to be notified of up-to-the minute updates on processing failures and Data Flow service exceptions, such as, for example, cluster, network, or other external failures. All Data Flow and Data Processor services use a Service Mesh to automatically report on their health and status. The Operations Service informs the centralized Data Flow Controller when a flow needs to be restarted or terminated (i.e., when there is a need for manual intervention).

6) Restarting Data Flows: Each Data Flow must track a high-watermark index at the lowest level of the data object (n-tuple, row, object, set, group, etc.) that it processes. This will facilitate a safe and automatic resumption of a data flow where it left off, after a failure. In an exemplary embodiment, this is a timestamp on the data object. Ordered data sets can use an index that is used for sorting. Each time a new data object is processed successfully, the new high-watermark is recorded in an audit log on the data flow backing store, so that when the flow is restarted, it knows where to pick up from. In an exemplary embodiment, restart logic is built into each Data Processor application. The Spark "Check pointing" function can further mitigate processing failures. After a failure, the processor first queries to load all data objects from the beginning of time, then uses polling logic to request changes since the high-water mark.

7) Data Processors: The Data Flow microservice spawns a pool of Data Processor microservices that are need for executing the flow. These processors inherit a flow context passed on from the Data Flow Controller, and contain all the meta-information specific to this Data Flow application. The Data Flow processor loads the Docker image for the underlying processing code (i.e., for either data ingestion, transformation, movement, provisioning, or stream processing) to execute on the appropriate processing platform, which is enabled on the underlying Kubernetes pod.

The following description relates to design considerations with respect to processor applications:

Distributed Processing Engines such as Spark, Kafka Streams, and Flink are expected to be natively integrated on the Kubernetes clusters and pods are pre-installed with them. These engines ensure consistent images are deployed across the Data Plane for portability.

Data Processor Code: The Spark-based code must adopt standard Data Processor APIs to communicate status, exceptions and other notifications with the Data Processor.

Dockerize Processor Code is used to create Dockerized images of Spark code written in either Spark SQL, Java, Scala, Python, or R, together with all dependencies, such as, for example, adapter libraries. Same applies to streaming (i.e., Spark, Kafka, Flink) code. Images can be built, packaged and deployed using Maven/Docker/Jules and deployed to Docker Hub on all Kubernetes clusters on the Data Plane.

Polyglot Programming Model: The selection of a programming language is based on the functional/non-functional capabilities available in the language for complex logic, developer preference/DevX, skill, or code that is auto-generated.

Separate DML from DDL: Separate out all data definition language (DDL) code from the Data Processing code. DDL changes at a much slower pace compared to data manipulation language (DML), however involves a much larger effort in terms of CI/CD automation, including schema deployment, data deployment and quality assurance (QA). Splitting the two into their own separate code repositories and CI/CD pipelines increases velocity.

Data Adapters: Adapters are pluggable components within a Data Processor code that enable the processor to connect to and read and/or write to a variety of external data sources and destinations in their native encoding, serialization/de-serialization, compression, and specialized compatibility rules for controlled schema evolution. This includes SQL/NoSQL databases via JDBC, Kafka topics, Avro, Parquet, ORC, streaming engines, object stores, file shares, CDC, etc. In an exemplary embodiment, processors are designed to easily choose/configure an adapter from a library of data adapters through dependency-injection on bootstrapping.

Metadata Sourcing and Capture: In an exemplary embodiment, all data assets within the Data Pipeline (and LDL) are identified with proper business and technical metadata.

Processors trigger requests to auto-source metadata for data sets that are newly ingested into the LDL. These requests are brokered by the global Metadata Service to auto-source metadata.

In an exemplary embodiment, processors are able to reuse metadata on data sets that are already available in the LDL through a local metadata cache lookup (first) and then the global cache.

Processors expose an API that can be used by the data processing programs executing within them, in order to automatically emit inetadata lineage and data quality monies and indicators for data that is ingested or created in the LDL. The latter can be automated further via the Photon Automated Governance API for declarative means to harvest metadata and lineage from programs.

Data Security: In an exemplary embodiment, processors are configured to follow organizational standard security policies and solutions. Data Protection: Use organizational standard encryption for data in-transit, data at-rest, and data in-use. Data-Centric Access: Implement consistent data-centric access policies and controls. Configure policies to protect against large scale access.

Data Processor Performance: When compute and storage are separated, there is a need to ensure that an optimal network bandwidth and latency exists for the large volumes of data shuttled across the network between storage and compute clusters. Limited/shared network throughput impacts data processing performance. Techniques to mitigate this include: 1) Workload placement policies to ensure optimal co-location of processing compute Clusters with data storage clusters, using knowledge of the data center or cloud Availability Zone topology. 2) Storage virtualization solutions such as Alluxio/Rook can be used to further accelerate performance (i.e., especially for Spark) when processing massive volumes of data by artificially creating "data locality" via local tiered data caches. These solutions are automatically kept in synchronization with the underlying physical stores and file systems.

8) Local & Global Metadata Services: Business and operational metadata that is emitted by a Data Flow is cached locally in the metadata service local to the Data Plane at first, before it is transmitted to the global metadata service on the Control Plane, where it is cached once again. This architecture pattern enables the following: First, it allows each metadata service local to a Data Plane to standardize its metadata to an organizational standard standard meta-model and format. This enables a leveraging of cloud native metadata acquisition services to harvest metadata in its native format to reap the benefits of a well-integrated solution. Second, multi-tiered caching of metadata also supports low latency access to it locally from data flows, and efficient rehydration of local Data Plane meta-stores.

9) Automated Tiered Data Governance: Data registration requirements are tiered. A minimal amount of PG Classification is performed using Automated PG classification on ingest. Additional registration rigor is applied based on data consumption usage patterns.

10) Data Pipeline Operational Services: The Data Pipeline's Control Plane includes an operational metadata service and a dashboard service to present a single operational view of system operations.

Operational Metadata Store: This service is vital to the functioning of the entire Data Pipeline system. It captures dynamic operational information from all the Data Plane and Control Plane services, and generates statistics that drives the intelligent placement, execution, and potentially throttling of Data Flow workloads within the system.

The operational metadata generated from the Data Plane and Control Plane services can be captured in the centralized operational metadata service repository for real-time analytics and overall, as well as drill-down views into the state/health of individual data flows.

The sidecar proxy pattern implemented by service mesh control planes can be deployed across all Data Pipeline services to generate standardized operational (trace) logs. The service mesh can ensure security policies are enforced for service-service (API) communications, in addition to enabling observability, failure handling, and usage as a way to throttle Data Flows.

The ability to define and manage to non-functional SLAs with respect to data availability, system up-time, and throughput, at a per data flow level is a key feature of this service. In an exemplary embodiment, data owners are able to have access to configure SLAs, be notified when the SLAs are not met, and visualize trends on their average fulfillment levels.

Logical Data Lake: The Logical Data Lake (LDL) architecture can take advantage of multi-cloud environments to enhance the foil owing: 1) Compute power available to support a large number of use cases and use cases of relatively high complexity. 2) Elastic storage and compute for efficient utilization of systems resources and costs. 3) Separate compute and storage in order to scale independently and support large volume processing.

The Data Pipeline architecture is a critical component of the LDL. It is the primary engine that orchestrates data across the lake. The core capabilities of a LDL which are enabled by the Data Pipeline include the following:

1) Standardized Data Zones are each optimized to balance data agility against a variety of consumption patterns. The Data Pipeline can ensure policy-driven provisioning into each Data Zone with design-time and online validations to help control data sprawl. The following is an exemplary list of data zones: A) Landing Zone (LZ) is a temporary location where data lands into the LDL from SORs/ADSs/external sources. B) Conformed Data Zone (CZ) is where the schema stays true to System of Record (SOR) with no modifications to structure or format. History is configurable. C) Semantic Data Zone (SZ) is modeled for highly reusable objects and built on top of CZ. D) Discovery Data Zone (DZ) is designed for ad-hoc exploration and analytics, and built on top of CZ, SZ, or OAZ. E) Interactive Query Data Zone (IQZ) schema/format is pre-optimized flatted, partitioned, Parquet/ORC, aggregated into a cube) for SQL queries per autonomous application, and built on top of CZ and/or SZ for in-place consumption. F) Operational Analytics Data Zone (OAZ) schema is designed to manage iterative analytics and machine learning (ML) modeling workflows, and built on top of CZ and/or SZ.

2) Centralized Data Registry (Catalog): A single data catalog implemented on the LDL enables searching and exploration across all data assets managed by the lake and their basic data definitions, among many other metadata points. The Centralized Data Registry also provides the business analyst with the ability to "single-click" request access to data sets for specific use cases, and apply data use policies to control usage. The Data Pipeline is a key metadata acquisition point in the LDL architecture for any new (enriched) data assets created within the confines of the lake.

3) Standardized Consumption Points: Data will be provisioned from the LDL into standardized Consumption Points that exist on premise today, as well to cloud native consumptions in the future that are yet to be standardized. The Data Pipeline can ensure policy-driven provisioning into fit-for-purpose consumption points, with fit-for-purpose formats and data structures, to simplify consumption as well as help control data sprawl.

4) Standardized Entitlements: All users and service accounts share the same entitlements to a particular data asset, regardless of where it is physically located in the lake. Entitlements can be policy driven at a cell level (i.e., an intersection of row/column) to enforce the strictest business level access controls.

5) Autonomous Data Pipeline Applications: Use Domain Driven Design (DDD) to break down large models and organize them into smaller well defined bounded contexts to help create autonomous Data Pipeline applications, with clear boundaries separating it from another application and therefore enabling further data agility.

Accordingly, with this technology, an optimized process for implementing methods and systems for delivering information with speed, scale, and quality to diverse destinations and use cases and providing advanced data processing to support real-time streaming processes and aggregated hatch processes is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory, computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer readable; medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing data flows and data processing operations with respect to a platform, the method being implemented by at least one processor, the method comprising:
   executing, by the at least one processor, a first set of microservice applications for coordinating data flows with respect to a first memory;
   executing, by the at least one processor, a second set of microservice applications for coordinating data processing operations; and
   executing, by the at least one processor, a third set of microservice applications for performing metadata processing that relates to the data flows and the data processing operations,
   wherein the first set of microservice applications includes a data flow order microservice application that relates to determining a processing order for a cluster-specific set of data flows that are assigned to a corresponding cluster, and
   wherein the method is implemented in a distributed hybrid cloud computing environment across a plurality of data planes, and
   wherein the method further comprises:
   performing predictive workload balancing among the plurality of data planes based on current and predicted demand to leverage and optimize processing of the data flows;
   determining resource availability among the plurality of data planes to at least one appropriate reserve resource on the distributed hybrid cloud environment;
   ensuring compliance with at least one data privacy policy with respect to the data flows across multiple data planes in the distributed hybrid cloud computing environment; and
   performing tracking of at least one predetermined service level agreement (SLA) with respect to a current workload backlog to offer a more predictable data delivery for the data flows.

2. The method of claim 1, further comprising generating at least one directed acyclic graph (DAG) that corresponds to at least one of the data flows, and
   wherein the first set of microservice applications includes a DAG interconnection microservice application that relates to using the at least one DAG to coordinate the at least one of the data flows.

3. The method of claim 1, further comprising using a machine learning algorithm to determine a data gravity for optimizing a location of at least one of the data flows.

4. The method of claim 1, wherein the resource availability is determined based on at least one from among a cost factor, a data gravity factor, a priority factor with respect to the at least one SLA, a processor speed factor, and a parallel processing optimization factor.

5. A computing apparatus for managing data flows and data processing operations with respect to a platform, the computing apparatus comprising:
   a processor;
   a memory; and
   a communication interface coupled to each of the processor and the memory,
   wherein the processor is configured to:
   execute a first set of microservice applications for coordinating data flows with respect to the memory;
   execute a second set of microservice applications for coordinating data processing operations; and
   execute a third set of microservice applications for performing metadata processing that relates to the data flows and the data processing operations,
   wherein the first set of microservice applications includes a data flow order microservice application that relates to determining a processing order for a cluster-specific set of data flows that are assigned to a corresponding cluster, and
   wherein the second set of microservice applications includes at least one from among a data ingestion microservice application that relates to ingesting data from a source that is external to the platform, a data stream processing microservice application that relates to performing continuous stream processing, and a data movement microservice application that relates to a bulk-copying of data from a first location within the platform to a second location within the platform, and wherein the processor is further configured to:
perform predictive workload balancing among a plurality of data planes in a distributed hybrid cloud computing environment based on current and predicted demand to leverage and optimize processing of the data flows;
determine resource availability among the plurality of data planes to at least one appropriate reserve resource on the distributed hybrid cloud environment;
ensure compliance with at least one data privacy policy with respect to the data flows across multiple data planes in the distributed hybrid cloud computing environment; and
perform tracking of at least one predetermined service level agreement (SLA) with respect to a current workload backlog to offer a more predictable data delivery for the data flows.

6. The computing apparatus of claim 5, wherein the first set of microservice applications includes at least one from among an inbound data flow microservice application that relates to first data flows that originate at a source that is external to the platform and terminate within the platform, an in-place data flow microservice application that relates to second data flows that originate and terminate within the platform, and an outbound data flow microservice application that relates to third data flows that originate within the platform and terminate at a destination that is external to the platform.

7. The computing apparatus of claim 5, wherein the third set of microservice applications includes a metadata sourcing microservice application that relates to capturing a lineage of data that flows within the platform.

8. The computing apparatus of claim 5, wherein the processor is further configured to execute a fourth set of microservice applications for controlling the data flows and the data processing operations with respect to the platform.

9. The computing apparatus of claim 8, wherein the fourth set of microservice applications includes a data flow controller microservice application that relates to assigning each of the data flows to a respective cluster within the platform.

10. The computing apparatus of claim 9, wherein the processor is further configured to use, for a particular data flow, at least one from among a location of a corresponding source and a location of a corresponding destination in order to determine a particular cluster to which the particular data flow is assigned.

11. The computing apparatus of claim 5, wherein the processor is further configured to generate at least one directed acyclic graph (DAG) that corresponds to at least one of the data flows, and wherein the first set of microservice applications includes a DAG interconnection microservice application that relates to using the at least one DAG to coordinate the at least one of the data flows.

12. The computing apparatus of claim 5, wherein the computing apparatus is implemented in a distributed hybrid cloud computing environment that includes at least one open source data processing container platform, at least one open source Spark distributed processing engine, and at least one deployment pipeline deployed across a data lake, and wherein the computing apparatus is integrated with each of an organizational network and infrastructure security, an organizational monitoring and alerting system, and an organizational operational infrastructure.

* * * * *